(12) United States Patent
Mitsumaki et al.

(10) Patent No.: US 11,216,754 B2
(45) Date of Patent: Jan. 4, 2022

(54) INFORMATION PROCESSING APPARATUS, RIDE-SHARING USER SELECTION METHOD, AND NON-TRANSITORY COMPUTER-READABLE STORAGE MEDIUM

(71) Applicant: Toyota Jidosha Kabushiki Kaisha, Toyota (JP)

(72) Inventors: Koichiro Mitsumaki, Nagoya (JP); Masato Endo, Nagakute (JP); Ryota Kondo, Nagoya (JP); Yasuhisa Obata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 16/354,663

(22) Filed: Mar. 15, 2019

(65) Prior Publication Data

US 2019/0287034 A1 Sep. 19, 2019

(30) Foreign Application Priority Data

Mar. 19, 2018 (JP) .............................. JP2018-050940

(51) Int. Cl.
*G06Q 10/02* (2012.01)
*G06Q 50/30* (2012.01)
*G06F 16/22* (2019.01)

(52) U.S. Cl.
CPC .............. *G06Q 10/02* (2013.01); *G06F 16/22* (2019.01); *G06Q 50/30* (2013.01)

(58) Field of Classification Search
CPC ............................ G06Q 10/02; G06Q 50/30
See application file for complete search history.

(56) References Cited

U.S. PATENT DOCUMENTS

| 8,140,256 B1* | 3/2012 | dos-Santos | G06Q 50/188 |
| | | | 701/532 |
| 2010/0280700 A1* | 11/2010 | Morgal | G06Q 10/02 |
| | | | 701/31.4 |

(Continued)

FOREIGN PATENT DOCUMENTS

JP 2017-010189 A 1/2017

OTHER PUBLICATIONS

Jorge, Diana et al.; "Assessing the viability of enabling a round-trip carsharing system to accept one-way trips: Application to Logan Airport in Boston"; Jul. 2015; Transportation Research Part C: Emerging Technologies; vol. 56; 359-372 (Year: 2015).*

(Continued)

*Primary Examiner* — George Chen
*Assistant Examiner* — Michael C Moroney
(74) *Attorney, Agent, or Firm* — Dinsmore & Shohl LLP

(57) ABSTRACT

Disclosed is an information processing apparatus including a reception unit configured to receive a use reservation of car sharing including designation of any one of round-trip car sharing and one-way car sharing, designation of a pickup location, and designation of a drop-off location from a user and store the use reservation in a use reservation database, and a selection unit configured to select, as users who share a ride in a vehicle, both of a first user who has made a use reservation for designating round-trip car sharing and a second user who has made a use reservation for designating one-way car sharing among a plurality of users who have made a use reservation with a pickup location and a drop-off location satisfying a predetermined condition.

9 Claims, 5 Drawing Sheets

(56) References Cited

U.S. PATENT DOCUMENTS

| | | | | |
|---|---|---|---|---|
| 2011/0137691 | A1* | 6/2011 | Johnson | G06Q 10/04 |
| | | | | 705/5 |
| 2013/0325521 | A1* | 12/2013 | Jameel | G06Q 10/02 |
| | | | | 705/5 |
| 2016/0321566 | A1* | 11/2016 | Liu | G01C 21/3438 |
| 2016/0321771 | A1* | 11/2016 | Liu | G01C 21/3438 |
| 2016/0356615 | A1* | 12/2016 | Arata | G06Q 50/30 |
| 2018/0216947 | A1* | 8/2018 | Sakata | G08G 1/20 |
| 2020/0372418 | A1* | 11/2020 | Hirose | G01C 21/20 |

OTHER PUBLICATIONS

Nourinejad, M., Roorda, M.J; "Carsharing operations policies: a comparison between one-way and two-way systems"; Transportation; 42; pp. 497-518; https://link.springer.com/article/10.1007/s11116-015-9604-3 (Year: 2015).*

* cited by examiner

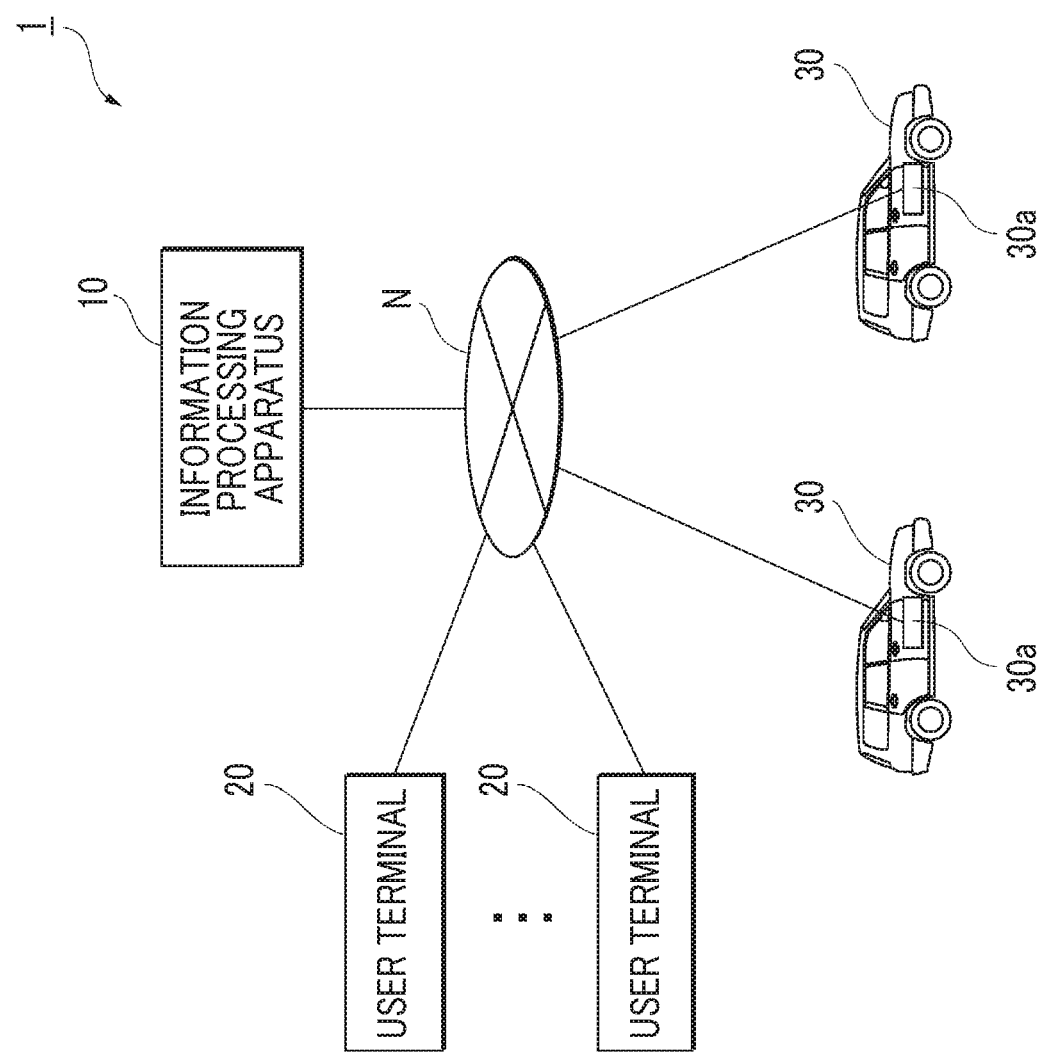

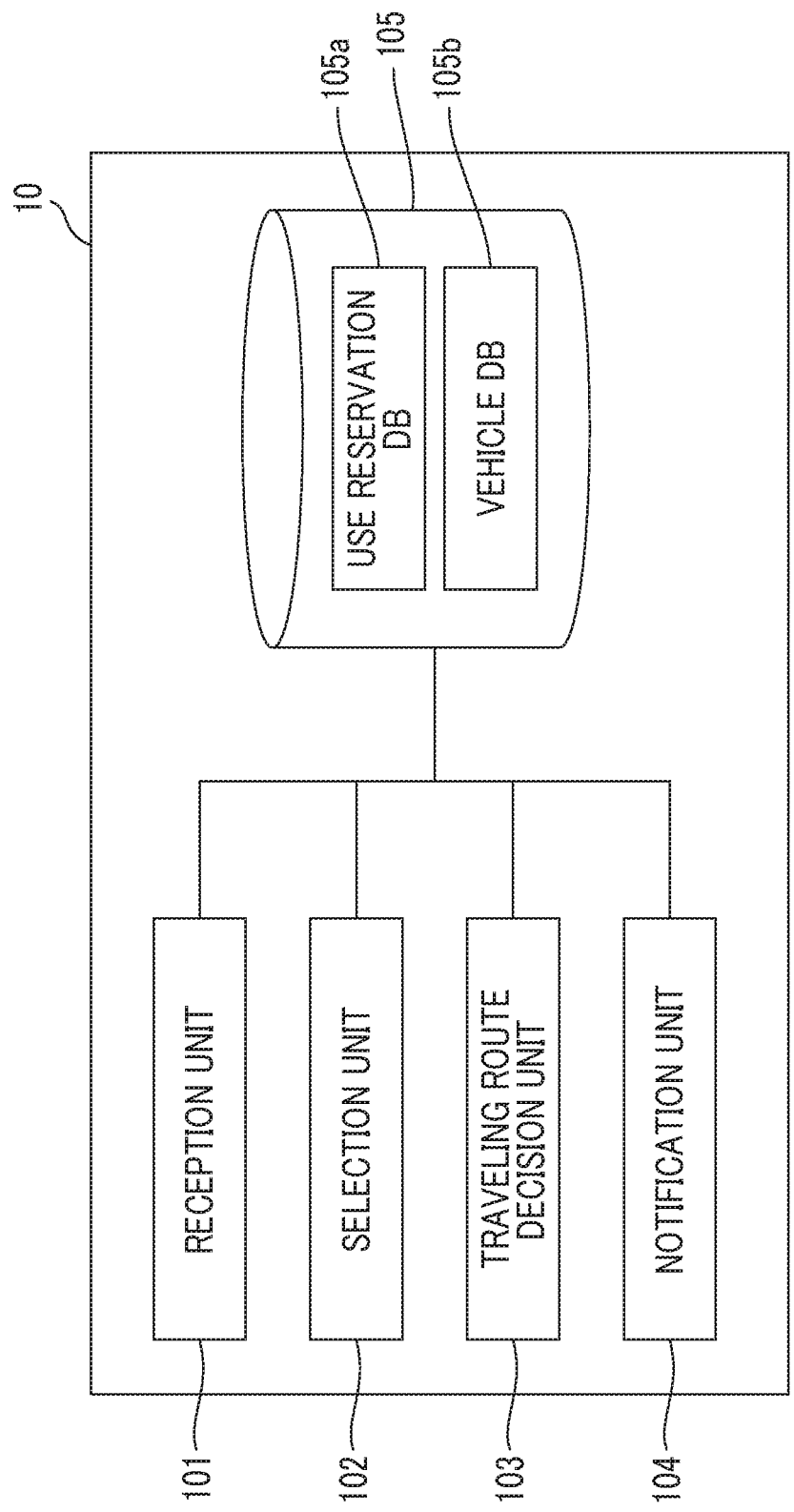

FIG. 3

USE RESERVATION DB

| USER ID | USE METHOD | PICKUP LOCATION | | | DROP-OFF LOCATION | |
|---|---|---|---|---|---|---|
| | | GETTING-IN POINT | DEPARTURE DATE AND TIME | RETURN DATE AND TIME | GETTING-OFF POINT | DEPARTURE DATE AND TIME |
| U01 | ONE-WAY | HOME (A-KU, TOKYO) | JANUARY 15 | – | STORE M (B-SHI, KANAGAWA-KEN) | – |
| U02 | ROUND-TRIP | HOME (A-KU, TOKYO) | JANUARY 15 10:00 | JANUARY 15 | STORE M (B-SHI, KANAGAWA-KEN) | JANUARY 15 14:00 |
| U03 | ROUND-TRIP | HOME (A-KU, TOKYO) | JANUARY 15 11:00 | JANUARY 15 | STORE M (B-SHI, KANAGAWA-KEN) | JANUARY 15 |
| U04 | ONE-WAY | HOME (C-SHI, KANAGAWA-KEN) | JANUARY 15 | – | STORE M (B-SHI, KANAGAWA-KEN) | – |
| U05 | ONE-WAY | HOME (C-SHI, KANAGAWA-KEN) | JANUARY 15 | – | STORE M (B-SHI, KANAGAWA-KEN) | – |
| U06 | ONE-WAY | HOME (A-KU, TOKYO) | JANUARY 15 | – | STORE M (B-SHI, KANAGAWA-KEN) | – |
| U07 | ONE-WAY | HOME (A-KU, TOKYO) | JANUARY 15 | – | STORE M (B-SHI, KANAGAWA-KEN) | – |
| U08 | ROUND-TRIP | HOME (A-KU, TOKYO) | JANUARY 15 | JANUARY 15 | STORE M (B-SHI, KANAGAWA-KEN) | JANUARY 15 14:00 |
| ... | ... | ... | ... | ... | ... | ... |

FIG. 4

VEHICLE DB

| VEHICLE ID | VEHICLE TYPE | CAPACITY | VACANCY INFORMATION | STORAGE LOCATION |
|---|---|---|---|---|
| M01 | XXX | 4 | VACANCY | A-SHI, TOKYO ... |
| M02 | XXX | 4 | VACANCY | A-SHI, TOKYO ... |
| M03 | YYY | 5 | VACANCY | A-SHI, TOKYO ... |
| M04 | YYY | 8 | IN USE | A-SHI, TOKYO ... |
| ... | ... | ... | ... | ... |

INFORMATION PROCESSING APPARATUS, RIDE-SHARING USER SELECTION METHOD, AND NON-TRANSITORY COMPUTER-READABLE STORAGE MEDIUM

CROSS-REFERENCE TO RELATED APPLICATIONS

This application claims priority to Japanese Patent Application No. 2018-050940 filed on Mar. 19, 2018, which is incorporated herein by reference in its entirety including the specification, drawings and abstract.

BACKGROUND

1. Technical Field

The present disclosure relates to an information processing apparatus, a ride-sharing user selection method, and a non-transitory computer-readable storage medium storing an information processing program.

2. Description of Related Art

At present, a service called car sharing in which a plurality of users can share one vehicle is becoming widespread. In a general car sharing service, a user needs to return a vehicle to a station where the vehicle is rented. Such a car sharing service is called round-trip.

A car sharing service called one-way in which a user is permitted to return a vehicle to a station other than a station where the vehicle is rented has also been known. For example, Japanese Unexamined Patent Application Publication No. 2017-010189 (JP 2017-010189 A) discloses a technique capable of improving availability of a shared vehicle in a one-way car sharing system.

Recently, as a kind of car sharing, there is a service called ride-sharing in which users who go toward the same destination share a ride in the same vehicle.

SUMMARY

In the future, with further development of a car sharing service, it is considered that a car sharing service is provided in various forms. For example, it is considered that a car sharing service in which a user is allowed to select round-trip car sharing and one-way car sharing, a car sharing service in which users who desire the round-trip car sharing and users who desire the one-way car sharing are matched to implement ride-sharing, and the like are provided.

Here, a problem that may occur when the service in which the users who desire the round-trip car sharing and the users who desire the one-way car sharing are matched to implement ride-sharing is provided will be described.

First, a case where there are a plurality of users who desire the round-trip and a plurality of users who desire the one-way, and each user has the same departure place and destination is assumed. In this case, when the users who desire the round-trip are matched with priority, the users who desire the one-way remain unmatched. In this state, while the users who desire the one-way have to be matched, then a vehicle will not be returned to a departure place, and there is a possibility that there is no sharable vehicle. As a result, users who are not yet matched cannot move to a destination. Since that ride-sharing is a system for efficient utilization of the vehicle, it is desirable that the occurrence of such a situation is suppressed, thereby allowing more users to use the ride-sharing.

The disclosure provides an information processing apparatus, a ride-sharing user selection method, and a non-transitory computer-readable storage medium storing an information processing program that implement efficient ride-sharing when both of round-trip car sharing and one-way car sharing are provided.

A first aspect of the disclosure relates to an information processing apparatus. The information processing apparatus includes a reception unit and a selection unit. The reception unit is configured to receive, from a user, a use reservation of car sharing, the use reservation of car sharing including designation of either round-trip car sharing or one-way car sharing, designation of a pickup location, and designation of a drop-off location and store the use reservation in a use reservation database. The selection unit is configured to select, as users who share a ride in a vehicle, both of a first user who has made a use reservation for designating round-trip car sharing and a second user who has made a use reservation for designating one-way car sharing among a plurality of users who have made a use reservation with a pickup location and a drop-off location satisfying a predetermined condition.

In the information processing apparatus according to the above-described first aspect, the selection unit may be configured to select users who share a ride in the vehicle such that the number of second users becomes equal to or greater than the number of first users.

In the information processing apparatus according to the above-described aspect, the selection unit may be configured to select users who share a ride in the vehicle depending on a ratio of the number of first users to the number of second users set such that the number of second users becomes equal to or greater than the number of first users who share a ride in the vehicle.

In the information processing apparatus according to the above-described aspect, the selection unit may be configured to change the ratio according to a proportion of the use reservation for designating the one-way, car sharing among the use reservations stored in the use reservation database.

In the information processing apparatus according to the above-described aspect, the selection unit may be configured to change the ratio such that, when the proportion of the use reservation for designating the one-way car sharing among the use reservations stored in the use reservation database becomes equal to or greater than a predetermined threshold, the number of second users who have made the use reservation for designating the one-way car sharing increases.

In the information processing apparatus according to the above-described aspect, the selection unit may be configured to change the ratio according to the number of vehicles usable for ride-sharing.

In the information processing apparatus according to the above-described aspect, the selection unit may be configured to change the ratio such that, when the number of vehicles usable for the ride-sharing becomes less than a predetermined threshold, the number of second users who have made the use reservation for designating the one-way car sharing increases.

In the information processing apparatus according to the above-described first aspect, the selection unit may be configured to, when the second user selectable as a user who shares a ride in the vehicle is not present and the number of users who are in the vehicle is less than the number of users who are able to get in the vehicle, select the first user, instead of the second user, as a user who shares a ride in the vehicle.

In the information processing apparatus according to the above-described first aspect, the selection unit may be configured to select, as a vehicle for ride-sharing, a vehicle being located within a predetermined range around a pickup location of the first user who has made the use reservation for designating the round-trip car sharing.

In the information processing apparatus according to the above-described first aspect, the selection unit may be configured to select one user from among a plurality of users who share a ride in the vehicle as a driver who drives the vehicle.

A second aspect of the disclosure relates to a ride-sharing user selection method that is executed by an information processing apparatus. The ride-sharing user selection method includes receiving a use reservation of car sharing including designation of any one of round-trip car sharing and one-way car sharing, designation of a pickup location, and designation of a drop-off location from a user and storing the use reservation in a use reservation database, and selecting, as users who share a ride in a vehicle, both of a first user who has made a use reservation for designating round-trip car sharing and a second user who has made a use reservation for designating one-way car sharing among a plurality of users who have made a use reservation with a pickup location and a drop-off location satisfying a predetermined condition.

A third aspect of the disclosure relates to a non-transitory computer-readable storage medium storing an information processing program. The information processing program causes a computer to execute receiving a use reservation of car sharing including designation of any one of round-trip car sharing and one-way car sharing, designation of a pickup location, and designation of a drop-off location from a user and storing the use reservation in a use reservation database, and selecting, as users who share a ride in a vehicle, both of a first user who has made a use reservation for designating round-trip car sharing and a second user who has made a use reservation for designating one-way car sharing among a plurality of users who have made a use reservation with a pickup location and a drop-off location satisfying a predetermined condition.

According to the above-described aspects, it is possible to provide a technique for implementing efficient ride-sharing when both of round-trip car sharing and one-way car sharing are provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a diagram showing a configuration example of a car sharing system according to an embodiment;

FIG. 2 is a diagram showing an example of the functional block configuration of an information processing apparatus;

FIG. 3 is a table showing an example of a use reservation DB;

FIG. 4 is a table showing a specific example of a vehicle DB; and

DETAILED DESCRIPTION OF EMBODIMENTS

Figure 5:
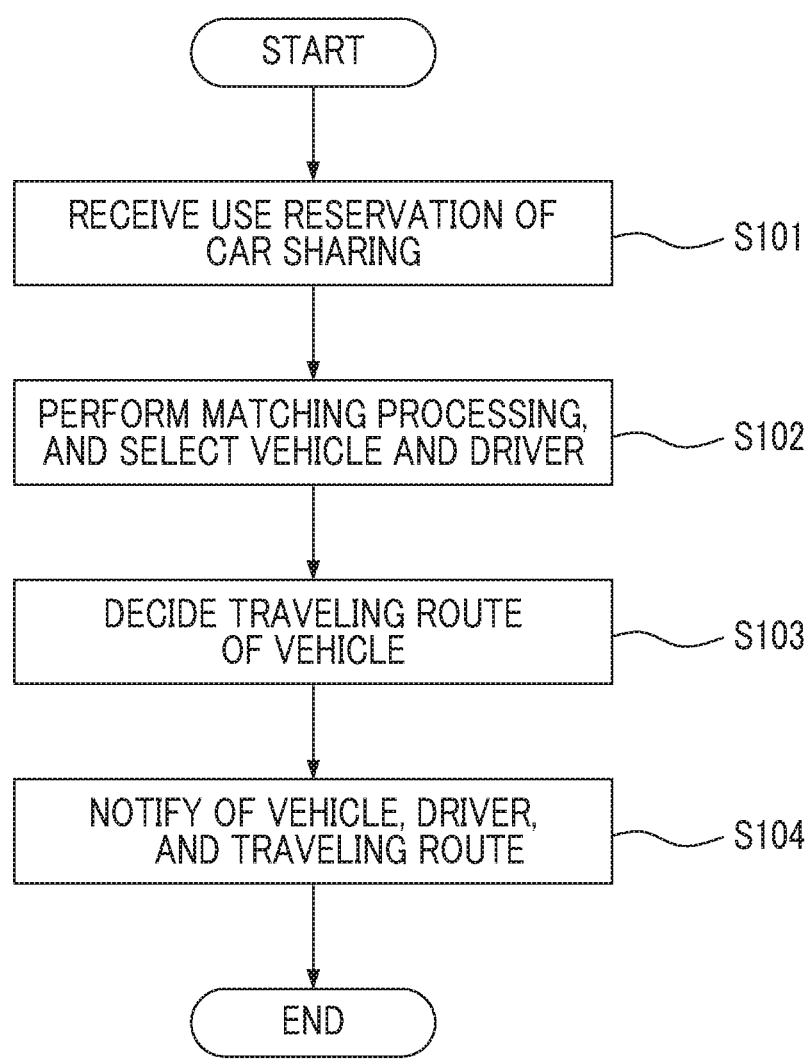
FIG. 5 is a flowchart showing an example of a processing procedure that is executed by the information processing apparatus.

Embodiments will be described referring to the accompanying drawings. In the drawings, the same reference numerals have the same or similar configurations.

System Configuration

FIG. 1 is a diagram showing a configuration example of a car sharing system 1 according to an embodiment. The car sharing system 1 includes an information processing apparatus 10, user terminals 20, and vehicles 30. In each of the vehicles 30, an in-vehicle device 30a is mounted. The information processing apparatus 10, the user terminals 20, and the in-vehicle devices 30a can perform communication with each other through a communication network N.

In general, sharing the same vehicle 30 among a plurality of users is called car sharing. The car sharing includes round-trip in which the vehicle 30 needs to be returned to a station where the vehicle is rented, and one-way in which a vehicle is permitted to be returned to a station other than a station where the vehicle is rented. Sharing a ride in the vehicle 30 toward a certain destination among a plurality of users is called ride-sharing. The ride-sharing allows a plurality of users to share the same vehicle 30, and can be considered as a kind of car sharing in a broad sense.

As described above, while various forms are considered as a car sharing service, the car sharing system 1 according to the embodiment supports both services of a round-trip car sharing service and a one-way car sharing service. The car sharing system 1 matches users who desire round-trip car sharing and users who desire one-way car sharing, thereby providing a service that implements movement through ride-sharing.

The information processing apparatus 10 receives a use reservation for car sharing from a user and registers the received use reservation in a database. The information processing apparatus 10 selects (matches) a plurality of users who share a ride in the same vehicle 30 from among a plurality of users who have made a use reservation with a pickup location and a drop-off location satisfying a predetermined condition. In the embodiment, in order to implement efficient ride-sharing, the information processing apparatus 10 selects (matches) users such that both of at least a user (first user) who has made a use reservation for designating the round-trip car sharing and a user (second user) who has made a use reservation for designating the one-way car sharing are included in users who share a ride in the same vehicle 30. The information processing apparatus 10 may be constituted of one or a plurality of information processing apparatuses or may be constituted using a cloud server or a virtual server.

The user terminal 20 is a terminal that is used by a user who uses the car sharing system 1, and is, for example, a smartphone, a tablet terminal, a mobile phone, a notebook personal computer, or the like. In the user terminal 20, a screen for reserving car sharing is displayed, and the user inputs various kinds of information (pickup location, drop-off location, and the like) on the screen to make a use reservation for car sharing.

The vehicle 30 is a vehicle that a plurality of users shares a ride and uses, and includes both of a private automobile and an automobile owned by a company. The vehicle 30 may be any vehicle as long as a plurality of users can get in the vehicle simultaneously and the vehicle can move along a free traveling route. Specifically, a vehicle 30 that a company rents for car sharing, a taxi capable of ride-sharing, or a privately owned vehicle 30 may be used. The vehicle 30 is not limited to an automobile, and may be, for example, a heavy vehicle 30, such as a bus, that ten-odd people to tens of people can get in or a motor cycle. The vehicle 30 may be a vehicle 30 (hereinafter, referred to as a "manual driving vehicle") that the user drives while holding a steering wheel, or may be a vehicle 30 (hereinafter, referred to as an "autonomous driving vehicle") capable of autonomous driving.

When the vehicle 30 is a manual driving vehicle, the in-vehicle device 30a may be a device (for example, a navigation device) that is able to display a traveling route to a destination notified from the information processing apparatus 10. When the vehicle 30 is an autonomous driving vehicle, the in-vehicle device 30a performs various kinds of control for autonomously driving the vehicle 30 along the traveling route to the destination transmitted from the information processing apparatus 10.

Functional Block Configuration

FIG. 2 is a diagram showing an example of the functional block configuration of the information processing apparatus 10. The information processing apparatus 10 includes a reception unit 101, a selection unit 102, a traveling route decision unit 103, a notification unit 104, and a storage unit 105.

The reception unit 101, the selection unit 102, the traveling route decision unit 103, and the notification unit 104 can be implemented by a central processing unit (CPU) of the information processing apparatus 10 executing a program stored in a memory. The program can be stored in a recording medium. The recording medium storing the program may be a non-transitory recording medium. The non-transitory recording medium is not particularly limited, and may be, for example, a recording medium, such as a universal serial bus (USB) memory or a compact disc read only memory (CD-ROM). The storage unit 105 can be implemented using a memory or a storage device in the information processing apparatus 10.

The storage unit 105 stores a use reservation database (hereinafter, referred to as a "use reservation DB") 105a (use reservation information) and a vehicle database (hereinafter, referred to as a "vehicle DB") 105b. In the use reservation DB 105a, a use reservation for car sharing registered by the user is stored. In the vehicle DB 105b, information relating to the vehicle 30 usable for ride-sharing is stored.

The reception unit 101 receives a use reservation for car sharing including designation of any one of round-trip car sharing and one-way car sharing, designation of a pickup location, and designation of a drop-off location from the user and stores the use reservation in the use reservation DB.

The selection unit 102 selects, as users who share a ride in the vehicle 30, both of a user (hereinafter, referred to as a "user who has reserved for round-trip") who has made a use reservation for designating the round-trip car sharing and a user (hereinafter, referred to as a "user who has reserved for one-way") who has made a use reservation for designating the one-way car sharing among a plurality of users who have made a use reservation with a pickup location and a drop-off location satisfying a predetermined condition. When the vehicle 30 for ride-sharing is a manual driving vehicle, the selection unit 102 selects one user from among a plurality of users who share a ride in the vehicle 30 as a driver who drives the vehicle 30.

The traveling route decision unit 103 decides, as a traveling route along which the vehicle 30 should travel, a traveling route passing through the pickup location and the drop-off location of each user who shares a ride in the vehicle 30. In deciding the traveling route, the traveling route decision unit 103 may predict a time at which the vehicle 30 passes through the pickup location of each user.

The notification unit 104 notifies the user terminal 20 of each user who shares a ride in the vehicle 30 of the traveling route, a predicted time when the vehicle 30 arrives at the pickup location (picks up the user), and the like.

FIG. 3 is a table showing an example of the use reservation DB 105a. In "user ID", an identifier for uniquely identifying a user in the car sharing system 1 is stored. In "use method", a use method of car sharing designated by the user is stored. Specifically, designation of any one of the round-trip car sharing and the one-way car sharing is stored. In "getting-in point" of "pickup location", information (address, latitude and longitude, or the like) indicating a point where the user desires to get in the vehicle 30 is stored. In "departure date and time" of "pickup location", date and time on which the user desires to depart from the getting-in point is stored. In "return date and time" of "pickup location", date and time on which the user who desires the round-trip car sharing desires to finally return to the pickup location is stored. In a case of a user who desires the one-way car sharing, none is set in "return date and time" of "pickup location". In "getting-off point" of "drop-off location", information (address, latitude and longitude, or the like) indicating a point where the user desires to get off the vehicle 30 is stored. In "departure date and time" of "drop-off location", date and time on which the user who desires the round-trip car sharing desires to get in the vehicle 30 and depart from the drop-off location is stored.

In the example of FIG. 3, a user having a user ID "U01" uses the one-way car sharing, and registers a use reservation for getting in the vehicle 30 at home on January 15 and getting off the vehicle 30 at a store M. A user having a user ID "U02" uses the round-trip car sharing, and registers a use reservation for getting in the vehicle 30 at home on January 15, 10:00, getting off the vehicle 30 at the store M, departing from the store M on January 15, 14:00, and returning home on January 15.

In "departure date and time", the whole or a part of the date and the time may be omitted when the user does not desire. For example, this means that the user U01 does not particularly desire the time of departure from home on January 15 (may depart from home at any time).

FIG. 4 is a table showing a specific example of the vehicle DB 105b. In "vehicle ID", an identifier for uniquely identifying the vehicle 30 for ride-sharing in the car sharing system 1 is stored. The vehicle ID may be, for example, a license number of the vehicle 30. In "vehicle type", a vehicle type or a manufacturer name of the vehicle 30 is stored. In "capacity", a seating capacity of the vehicle 30 is stored. In "vacancy information", information indicating whether the vehicle 30 is usable or in use is stored. In "storage location", information indicating a location where the vehicle 30 is stopped is stored. Since the storage location is also a location (a location capable of getting-in) where a user who holds a role of a driver can get in the vehicle 30, the storage location may be called a station where the vehicle 30 is rented.

Processing Procedure

Subsequently, a processing procedure that is executed by the information processing apparatus 10 will be described.

FIG. 5 is a flowchart showing an example of the processing procedure that is executed by the information processing apparatus 10.

In Step S101, the reception unit 101 receives a use reservation for car sharing from a user who desires to use car sharing and stores the use reservation in the use reservation DB 105a. The reception unit 101 may display a screen for receiving a use reservation on the user terminal 20 of the user who desires the use reservation. The user inputs designation of any one of the round-trip car sharing and the one-way car sharing, a getting-in point, a time of departure from a pickup location, a getting-off point, a time of departure from the getting-off point, and the like on the screen, thereby registering a desired use reservation in the information processing apparatus 10.

In Step S102, the selection unit 102 matches a plurality of users who have made the use reservation with the pickup location and the drop-off location satisfying a predetermined condition, thereby selecting users who share a ride in the vehicle 30 such that both of at least a user who has reserved the round-trip and a user who has reserved the one-way are included. The selection unit 102 selects the vehicle 30 (the vehicle 30 to be rented) for ride-sharing, and when the vehicle 30 for ride-sharing is a manual driving vehicle, selects one user from among a plurality of users who share a ride in the vehicle 30 as a driver who drives the vehicle 30. For example, the selection unit 102 may select, as the vehicle 30 for ride-sharing, the vehicle 30 having the storage location within a predetermined range (for example, within 2 km or the like) around the pickup location of the user who has selected the round-trip, and may select the user who has selected the round-trip as a driver who drives the vehicle 30.

Here, "the use reservation with the pickup location and the drop-off location satisfying the predetermined condition" means a combination of use reservations in capable of drawing a traveling route such that conditions for the getting-in point, the departure date and time of the pickup location, the return date and time, the getting-off point, and the departure date and time of the drop-off location designated by the use reservations are satisfied. Such a combination may be, for example, a combination of use reservations in which the "getting-in point" is the same or is included within a predetermined range (for example, within 10 km or the like), the "arrival point" is the same, each of the "departure date and time" and the "return date and time" of the pickup location is the same day and within a predetermined time (for example, time deviation is within one hour or the like), and the "departure date and time" of the drop-off location is the same day and within a predetermined time (for example, time deviation is within one hour or the like). That is, a combination of use reservations in which the locations of the pickup location and the drop-off location, or the departure date and time and the return date and time designated by the use reservations are the substantially same may be applied.

When the getting-in point and the getting-off point of the user who has reserved the one-way are included within a predetermined range (for example, within 5 km or the like from any point on a traveling route) from a traveling route connecting the getting-in point and the getting-off point of the user who has reserved the round-trip, and the vehicle 30 is out of the traveling route and goes toward the getting-in point of the user who has reserved the one-way, a combination of use reservations in which the vehicle 30 can arrive at the getting-in point within a predetermined time from the departure date and time designated by the user who has reserved the one-way may be applied.

Both of the user who has reserved the round-trip and the user who has reserved the one-way are included in the users who share a ride in the vehicle 30, whereby it is possible to allow the user who has reserved the round-trip to return the vehicle 30 to a rent location, and to efficiently send the user who has reserved the one-way to the drop-off location. With this, it is possible to suppress a possibility that solely the users who have reserved the one-way are matched and the vehicle 30 is not returned.

The selection unit 102 may select the users who share a ride in the vehicle 30 such that the number of users who have reserved the one-way becomes equal to or greater than the number of users who have reserved the round-trip. A specific example will be described referring, to FIG. 3. In the example of FIG. 3, in regards to use reservations of a user U01 to a user U08, it is assumed that a combination of the use reservations of any users corresponds to "the use reservation with the pickup location and the drop-off location satisfying the predetermined condition" (the same applies in the following description). It is also assumed that the seating capacity of the vehicle 30 is four persons (the same applies in the following description). In this case, the selection unit 102 may select, for example, the user U02 who has reserved the round-trip and the users U01, the user U04, and the user U05 who have reserved the one-way as the users who share a ride in the vehicle 30.

The selection unit 102 may select the user who shares a ride in the vehicle 30 according to a prescribed ratio of the users who have reserved the round-trip to the users who have reserved the one-way, that is, a prescribed ratio (hereinafter, referred to as a "selection ratio", and for example, one-way: round-trip=1:1, 2:1, 3:1, 3:2, or the like) such that the number of users who have reserved the one-way becomes equal to or greater than the number of users who have reserved the round-trip. A specific example will be described referring to FIG. 3. When it is assumed that the selection ratio is 1:1, the selection unit 102 may select, for example, the user U02 and the user U03 who have reserved the round-trip and the user U04 and the user U05 who have reserved the one-way as the users who share a ride in the vehicle 30.

The selection unit 102 may change the selection ratio according to a proportion of use reservations for designating the one-way in the use reservations stored in the use reservation DB 105a or the number of vehicles 30 usable for ride-sharing. For example, when the proportion of the use reservations for designating the one-way in the use reservation DB 105a becomes equal to or greater than a predetermined threshold (for example, 50% or the like) (that is, when the use reservations for the one-way increase), the selection unit 102 may change the selection ratio such that the users who designate the one-way increase, thereby allowing the user who designates the one-way to be easily selected. On the contrary, when the proportion of the use reservations for designating the one-way in the use reservation DB 105a falls below the predetermined threshold (for example, 50% or the like) (that is, the use reservation for the one-way decreases), the selection ratio may be decreased, for example, from 2:1 to 1:1, thereby allowing the user who designates the round-trip to be easily selected. With this, it is possible to suppress a situation in which the user who designates the round-trip is hardly selected while maintaining a situation in which the user who designates the one-way is easily selected.

For example, when the number of usable vehicles 30 in the vehicle DB 105b becomes less than a predetermined threshold (for example, the number of vehicles 30 may be equal to or greater than the number of use reservations or the like, or may be a fixed value) (that is, when there is no margin in the number of vehicles 30), the selection unit 102 may change the selection ratio such that the users who designate the one-way increase, thereby allowing the user who designates the one-way to be easily selected. On the contrary, when the number of usable vehicles 30 in the vehicle DB 105*b* becomes equal to or greater than the predetermined threshold (that is, there is a margin in the number of vehicles 30), the selection ratio may be decreased, for example, from 2:1 to 1:1, thereby allowing the user who designates the round-trip to be easily selected.

When the "user who has reserved the one-way" selectable as the user who shares a ride in the vehicle 30 is not present, and the number of users who are in the vehicle 30 is less than the number of users who can get in the vehicle 30 (that is, when an upper limit of the seating capacity is not reached), the selection unit 102 may select the user who has reserved the round-trip, instead of the user who has reserved the one-way, as the user who shares a ride in the vehicle 30. A specific example will be described referring to FIG. 3. It is assumed that the users U04 to U07 are not present. First, the selection unit 102 selects the user U01 and the user U02 in order that the number of users who have reserved the one-way becomes equal to or greater than the number of users who have reserved the round-trip or in order that the ratio instructed by the selection ratio (here, it is assumed to be 1:1) is reached. In this state, solely the user U03 and the user U08 who have reserved the round-trip remain in the use reservation DB, and the user who has reserved the one-way is not present. Note that the other two persons can get in the vehicle 30. Accordingly, the selection unit 102 selects the user U03 and the user U08 who have reserved the round-trip, instead of the user who has reserved the one-way, as the users who share a ride in the vehicle 30.

In Step S103, when the vehicle 30 for ride-sharing is a manual driving vehicle, the traveling route decision unit 103 decides a traveling route for departing from the storage location of the vehicle 30, and then, going toward the drop-off location while passing through all of the pickup locations of other users excluding the user who holds a role of a driver among the users who share a ride. When the vehicle 30 for ride-sharing is an autonomous driving vehicle, the traveling route decision unit 103 decides a traveling route for departing from the storage location, and then, going toward the drop-off location while passing through all of the pickup locations in the use reservations of a plurality of users who share a ride.

In Step S104, when the vehicle 30 for ride-sharing is a manual driving vehicle, the notification unit 104 notifies the user terminal 20 of the user who holds a role of a driver of information for requesting driving, information indicating the storage location of the vehicle 30 for ride-sharing, and information indicating the traveling route decided in Step S103. The predicted time at which the vehicle 30 arrives may be notified to the user terminal 20 of a user other than the user who holds a role of a driver. The notification unit 104 may directly notify the in-vehicle device 30*a* (for example, a navigation device) of the vehicle 30 for ride-sharing of information indicating the traveling route. The user who holds a role of a driver goes to the notified storage location to receive the vehicle 30 and drives the vehicle 30 depending on the traveling route designated by the in-vehicle device 30*a*, thereby going toward the drop-off location while picking up all other ride-sharing users.

When the vehicle 30 for ride-sharing is an autonomous driving vehicle, the notification unit 104 notifies the in-vehicle device 30*a* of the vehicle 30 for ride-sharing of information indicating the traveling route decided by the traveling route decision unit 103. The in-vehicle device 30*a* of the vehicle 30 controls the vehicle 30 depending on the notified traveling route, thereby implementing autonomous driving to depart from the storage location and to go to the drop-off location while passing through the pickup location of each ride-sharing user.

Supplementary Note

In the embodiment described above, the number of users who are scheduled to act together may be registered in the use reservation DB 105*a*. The selection unit 102 may select the vehicle 30 for ride-sharing in consideration of the number of users who are scheduled to act with each ride-sharing candidate user and the seating capacity of the vehicle 30.

The above-described embodiment is for facilitating the understanding of the disclosure and is not to be interpreted to limit the disclosure. The flowchart described in the embodiment, a sequence, elements in the embodiment, and arrangement, material, condition, shape, size, and the like of each of the elements are not limited to those described above and can be appropriately modified. In addition, components described in different embodiments can be partially substituted with each other or can be combined with each other.

What is claimed is:

1. A car sharing system comprising:
an information processing apparatus comprising a central processing unit and an autonomous vehicle comprising an in-vehicle device;
wherein the central processing unit is configured to:
  receive, from a user, a use reservation of car sharing, the use reservation of car sharing including designation of either round-trip car sharing or one-way car sharing, designation of a pickup location, and designation of a drop-off location and store the use reservation in a use reservation database;
  select, as users who share a ride in a vehicle, both of a first user who has made a use reservation for designating round-trip car sharing and a second user who has made a use reservation for designating one-way car sharing among a plurality of users who have made a use reservation with a pickup location and a drop-off location satisfying a predetermined condition depending on a ratio of the number of first users to the number of second users set such that the number of second users becomes equal to or greater than the number of first users who share a ride in the vehicle;
  determine a traveling route along which the vehicle should travel, wherein the traveling route passes through the pickup location and the drop-off location of each user;
  notify a user terminal of each user who shares a ride in the vehicle of the traveling route and a predicted time when the vehicle arrives at the pickup location; and
  notify the in-vehicle device of the traveling route, and
wherein the in-vehicle device is configured to control the vehicle to autonomously drive along the traveling route.

2. The car sharing system according to claim 1, wherein the central processing unit is configured to change the ratio according to a proportion of the use reservation for designating the one-way car sharing among the use reservations stored in the use reservation database.

3. The car sharing system according to claim 2, wherein the central processing unit is configured to change the ratio such that, when the proportion of the use reservation for designating the one-way car sharing among the use reservations stored in the use reservation database becomes equal to or greater than a predetermined threshold, the number of second users who have made the use reservation for designating the one-way car sharing increases.

4. The car sharing system according to claim 1, wherein the central processing unit is configured to change the ratio according to the number of vehicles usable for ride-sharing.

5. The car sharing system according to claim 4, wherein the central processing unit is configured to change the ratio such that, when the number of vehicles usable for the ride-sharing becomes less than a predetermined threshold, the number of second users who have made the use reservation for designating the one-way car sharing increases.

6. The car sharing system according to claim 1, wherein the central processing unit is configured to, when the second user selectable as a user who shares a ride in the vehicle is not present and the number of users who are in the vehicle is less than the number of users who are able to get in the vehicle, select the first user, instead of the second user, as a user who shares a ride in the vehicle.

7. The car sharing system according to claim 1, wherein the central processing unit is configured to select, as a vehicle for ride-sharing, a vehicle being located within a predetermined range around a pickup location of the first user who has made the use reservation for designating the round-trip car sharing.

8. The car sharing system according to claim 1, wherein the central processing unit is configured to select one user from among a plurality of users who share a ride in the vehicle as a driver who drives the vehicle.

9. A ride-sharing user selection method that is executed by a car sharing system, the ride-sharing user selection method comprising:
receiving, by an information processing apparatus, a use reservation of car sharing including designation of any one of round-trip car sharing and one-way car sharing, designation of a pickup location, and designation of a drop-off location from a user and storing the use reservation in a use reservation database;
selecting, as users who share a ride in a vehicle, by the information processing apparatus, both of a first user who has made a use reservation for designating round-trip car sharing and a second user who has made a use reservation for designating one-way car sharing among a plurality of users who have made a use reservation with a pickup location and a drop-off location satisfying a predetermined condition depending on a ratio of the number of first users to the number of second users set such that the number of second users becomes equal to or greater than the number of first users who share a ride in the vehicle;
determining, by the information processing apparatus, a traveling route along which the vehicle should travel, wherein the traveling route passes through the pickup location and the drop-off location of each user;
notifying, by the information processing apparatus, a user terminal of each user who shares a ride in the vehicle of the traveling route and a predicted time when the vehicle arrives at the pickup location;
notifying, by the information processing apparatus, an in-vehicle device of a vehicle of the traveling route; and
controlling, by the in-vehicle device, the vehicle to autonomously drive along the traveling route.

* * * * *